United States Patent [19]

Nakajima et al.

[11] Patent Number: 5,445,481
[45] Date of Patent: Aug. 29, 1995

[54] DRESSING APPARATUS FOR AN ELECTRODE TIP

[75] Inventors: Toshiharu Nakajima, Yokkaichi; Tadashi Goto, Mie; Shinji Hoshino, Suzuka, all of Japan

[73] Assignee: Honda Giken Kogyo Kabushiki Kaisha, Tokyo, Japan

[21] Appl. No.: 98,800

[22] Filed: Jul. 29, 1993

[30] Foreign Application Priority Data

Jul. 31, 1992 [JP] Japan .................................. 4-204701

[51] Int. Cl.⁶ .............................................. B23C 3/12
[52] U.S. Cl. ...................................... 409/140; 408/11
[58] Field of Search ............... 409/140, 181, 131, 132, 409/149, 175, 218; 408/6, 7, 9, 12, 11; 901/40, 41

[56] References Cited

U.S. PATENT DOCUMENTS

| | | | |
|---|---|---|---|
| 2,286,931 | 6/1942 | Radeke | 409/181 X |
| 2,689,363 | 9/1954 | Frye | 408/11 |
| 2,930,289 | 3/1960 | Swarts | 409/181 X |
| 4,856,949 | 8/1989 | Shimada | 409/140 |
| 4,921,377 | 5/1990 | Hoch et al. | 409/140 |
| 4,966,506 | 10/1990 | Slanker | 409/140 |
| 5,332,342 | 7/1994 | Kizaki et al. | 409/140 |

*Primary Examiner*—Z. R. Bilinsky
*Attorney, Agent, or Firm*—Nikaido Marmelstein Murray & Oram

[57] ABSTRACT

In an electrode tip dressing apparatus, a relatively weak pressure is applied on an electrode tip at the electrode setting, then a strong pressure is applied at finishing, and finally a lowered pressure is applied after a predetermined time period. The blade holder is provided with a clearance over the entire length of the blade for discharging the chips produced during machining of the electrode tip, thereby preventing blinding of blades caused by cutting chips.

9 Claims, 9 Drawing Sheets

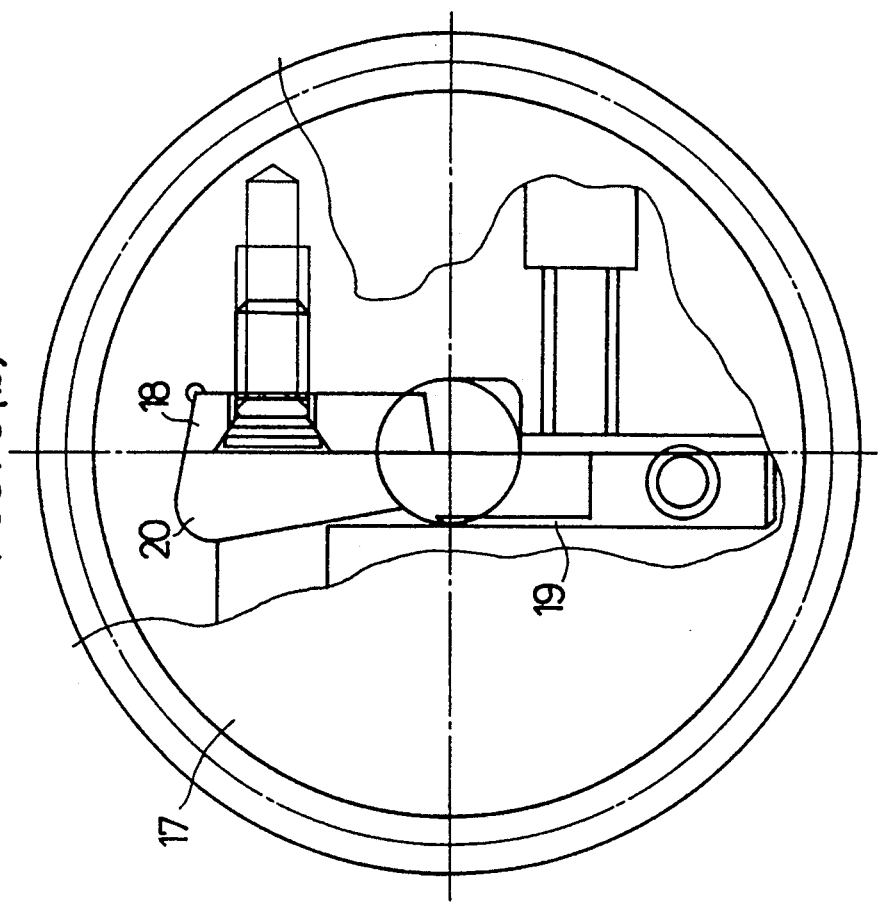
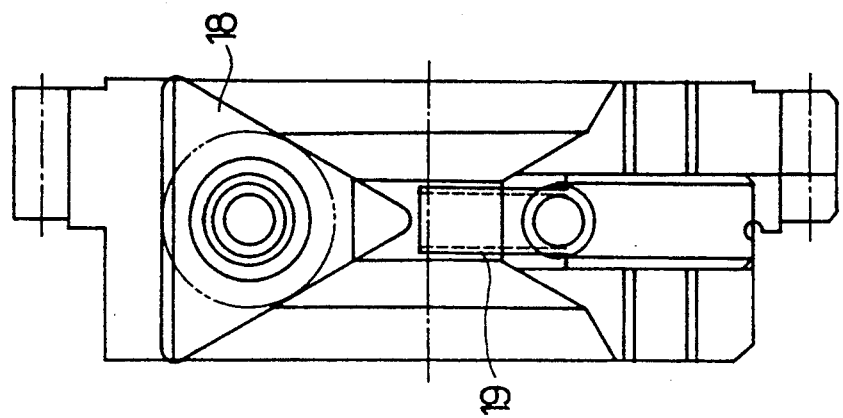

DRESSING APPARATUS FOR AN ELECTRODE TIP

BACKGROUND OF THE INVENTION

1. Field of the Invention

The present invention relates to a dressing apparatus for reforming an electrode tip of a resistance welder by a rotating cutting blade.

2. Brief Description of the Prior Art

Various methods have been disclosed for reforming by dressing of an electrode tip of a resistance welder. In general, using a motor powered by compressed air or hydraulic pressure or using an electric motor, a blade is rotated via a belt or chain, and the electrode tip is machined.

When an electrode tip is machined both at its end surface and slant surface therearound, a blade formed integrally of end and slant cutters is used. For removing chips produced by cutting process, compressed air is blown from the exterior in general. The pressure applied on the blade at the dressing operation of the tip is the same as that applied at welding. Accordingly, a shock produced by pressing is likely to cause damage of the cutting blade. This can also disturb the proper machining of the electrode tip and leave a unmachined portion in the center of the end surface thereof.

SUMMARY OF THE INVENTION

An object of the present invention is to provide a dressing apparatus capable of preventing damage of blades due to shock caused upon setting of an electrode tip and production of burrs caused by penetration of blades.

Another object of the present invention is to provide a dressing apparatus capable of performing an automatic and excellent reforming in a short time period employing a cheaper tip material, and also preventing blinding of blades caused by cutting chips.

Accordingly, the present invention provides an improved dressing apparatus which comprises a pressure control means for controlling a pressure applied on the electrode tip against a blade holder, whereby the electrode tip is pressed at setting of the electrode tip with a force relatively smaller than that applied at welding, and the electrode tip is pressed when being machined with a force slightly greater than that applied at setting step, and after a predetermined time period the tip is pressed with again a smaller force.

Also, a blade holder is provided with a clearance for discharging cutting chips, and an end blade is formed to slightly extend with its end portion, over the center of the blade holder.

BRIEF DESCRIPTION OF THE DRAWINGS

FIG. 3(a) is a side view and FIG. 3(b) is a front view of a blade holder in the dressing device of FIG. 1;

DETAILED DESCRIPTION OF THE PREFERRED EMBODIMENTS

Figure 1:
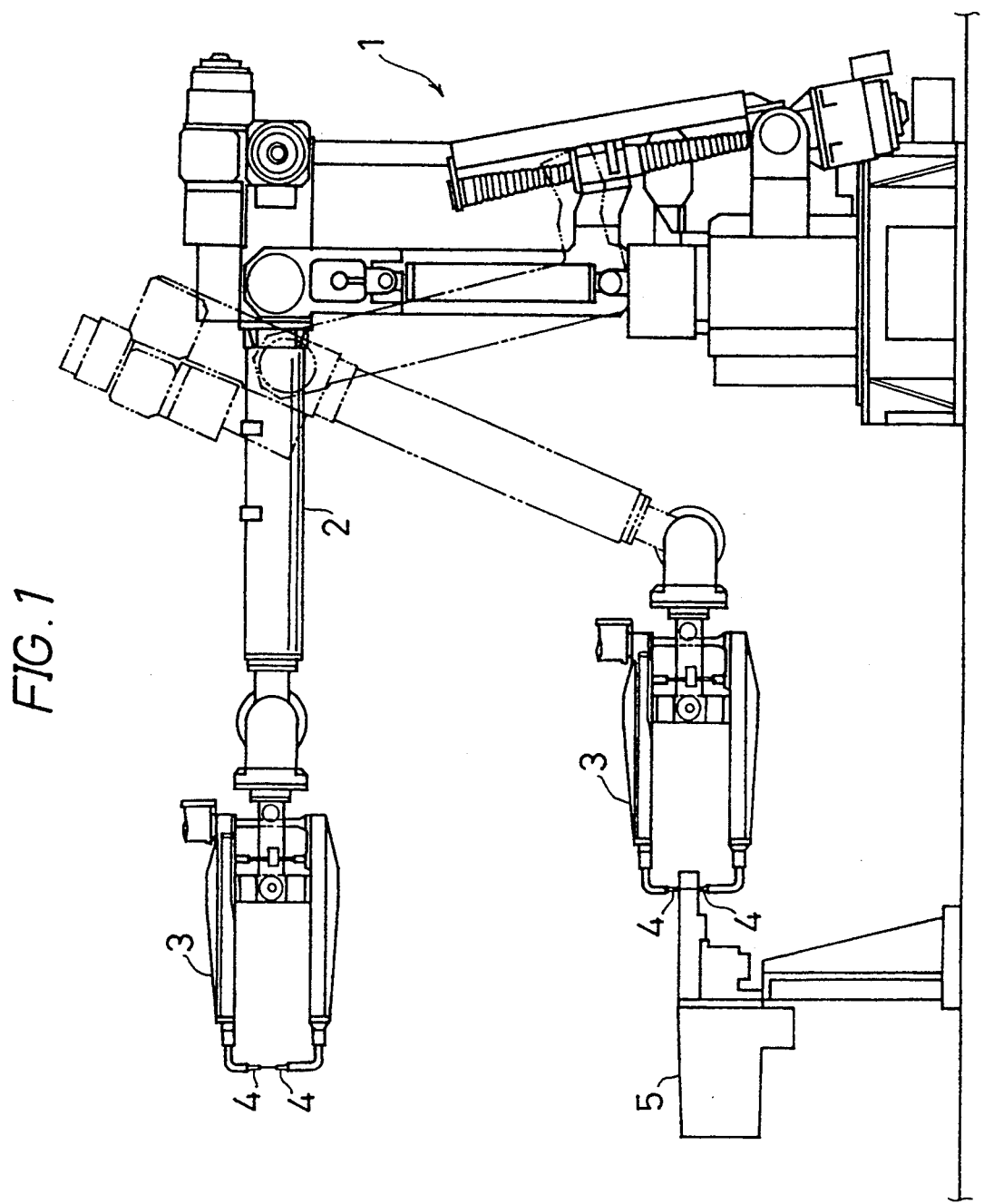
FIG. 1 is an elevational view of an electrode tip dressing apparatus according to the invention.

FIG. 1 shows an electrode tip dressing apparatus and its operation. A reference numeral 1 is a welding robot, to the tip of whose rotatable arm 2 is mounted a welding gun, such as an X-type gun 3. To welding gun 3 is attached an electrode 4 which is a tip for a spot welder. The tip 4 is automatically controlled such that it is replaced and automatically reformed after several times of welding operation.

Figure 2:
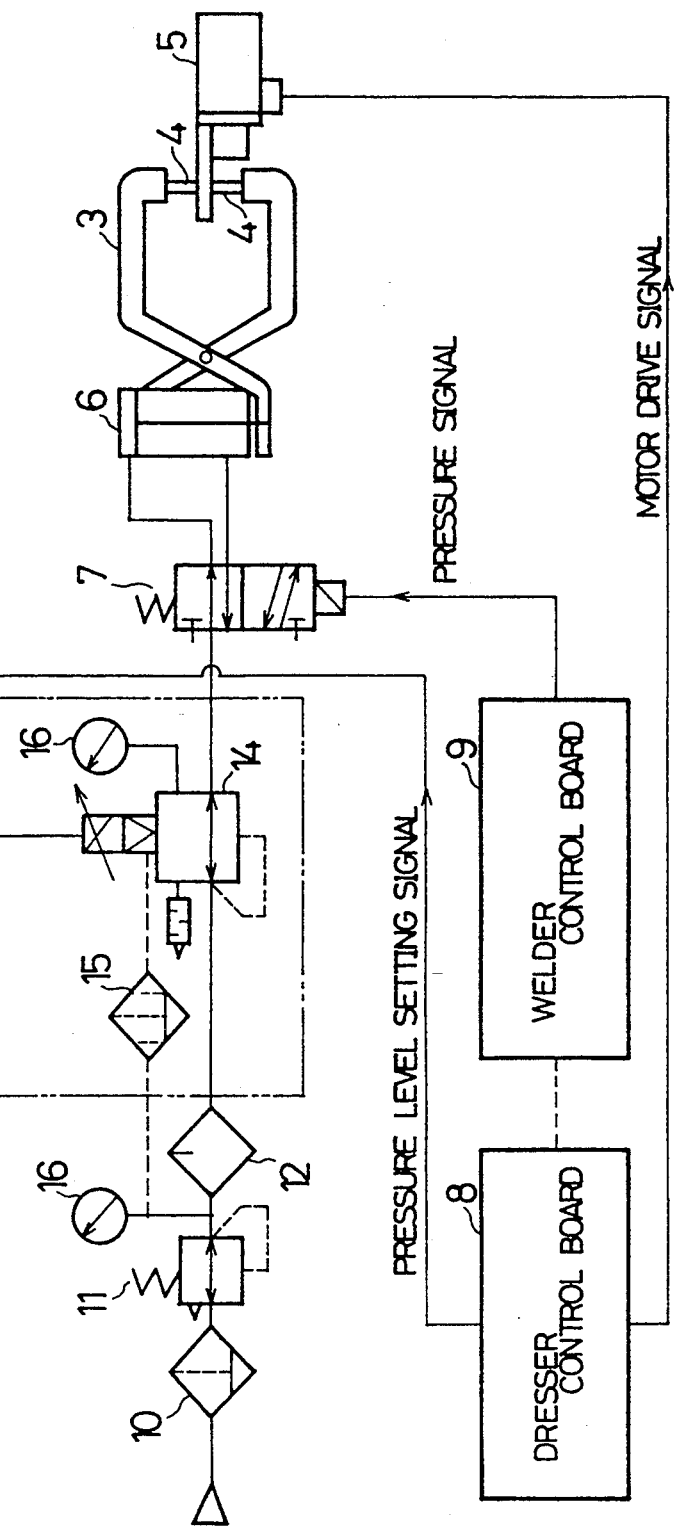
FIG. 2 is a schematic diagram of a pressure control system for the welding gun of FIG. 1.

FIG. 2 shows a schematic illustration of a pressure control system for the welding gun 3. The pressure applied on the gun 3 is controlled by an air cylinder 6 via a solenoid valve 7 disposed in the air passage. To the solenoid valve 7, a dressing pressure signal based on a pressure level setting signal produced from a weld control board 9 and a welding pressure signal produced from a weld control board 9 are applied, so that both the pressure and time are controlled.

The compressed air applied from a not illustrated compressor is passed via a filter 10, the pressure thereof is regulated by a pressure regulator 11, and enters a pressure control device 13 for dressing through an oiling device 12. The pressure control device 13 includes an electro/air proportion valve 14 producing an output air quantity in proportion to an input voltage, and controls the pressure of the electrode tip 4 applied on the blade holder in the dressing device 5. From a dresser control board 8, a motor actuation signal is produced to the dressing device 5. A numeral 15 is a mist separator and 16 is a pressure gauge.

In FIG. 3, a numeral 17 is a blade holder on which a cutters for electrode tip 4 are mounted, 18 is a slant blade for shaping a inclined edge of the tip 4, and 19 is an end blade for an end of the tip 4. The end blade 19 is formed to slightly extend with its end portion over the center of blade holder 17. The holder 17 is provided with a clearance over the entire length of the blade for discharging the chips produced during machining of the electrode tip 4.

Figure 4:
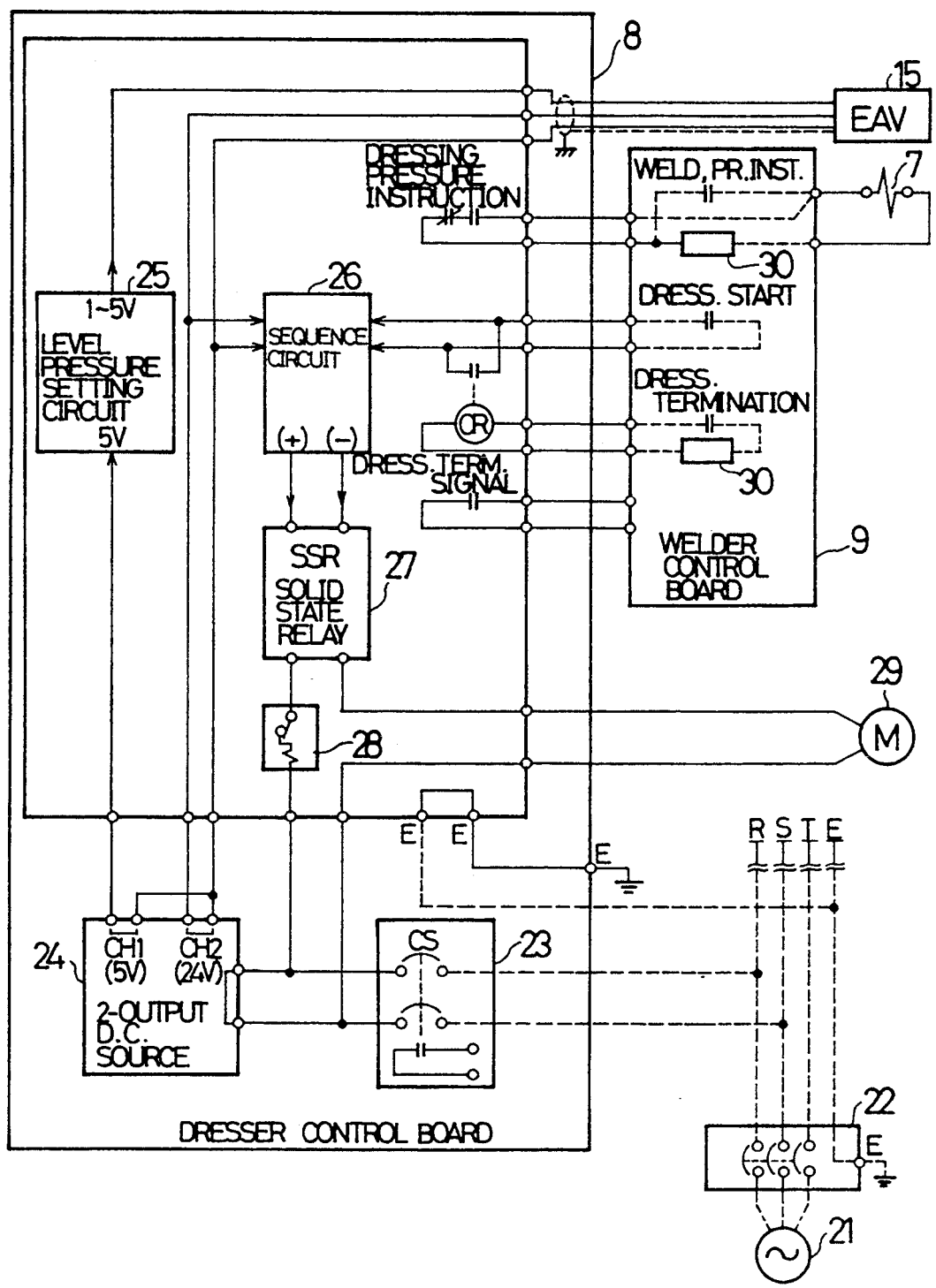
FIG. 4 is a schematic illustration of an internal construction including a dressing device and a welder controller.

In FIG. 4, there is shown a 3 phase (R,S,T) 200 V a.c. electric source 21 for welding, which supplies an actuation voltage to dresser control board 8 via a breaker 22.

The dresser control board 8 includes a control switch 23 which turns open upon any overcurrent condition, a two output d.c. source 24 including a 5 V channel-1 and a 24 V channel-2 and each of control circuits formed on a printed wiring board. These control circuits include: a pressure setting circuit 25 for setting the levels of five steps and supplying the pressure level setting signals to the electro/air proportion valve 14; and a sequence circuit 26 to produce a dresser actuation signal, etc. Through a solid state relay 27 and an overcurrent relay 28, an actuation power is supplied to a drive motor 29 for dressing device 5. From the printed wiring board, a dressing pressure instruction and a dressing termination signal are produced.

The welder control board 9 including control power sources 30 produces a dressing instruction, a welding pressure instruction (pressure signal) to solenoid valve 7, and a dressing start instruction to the dresser control board 8.

Figure 5:
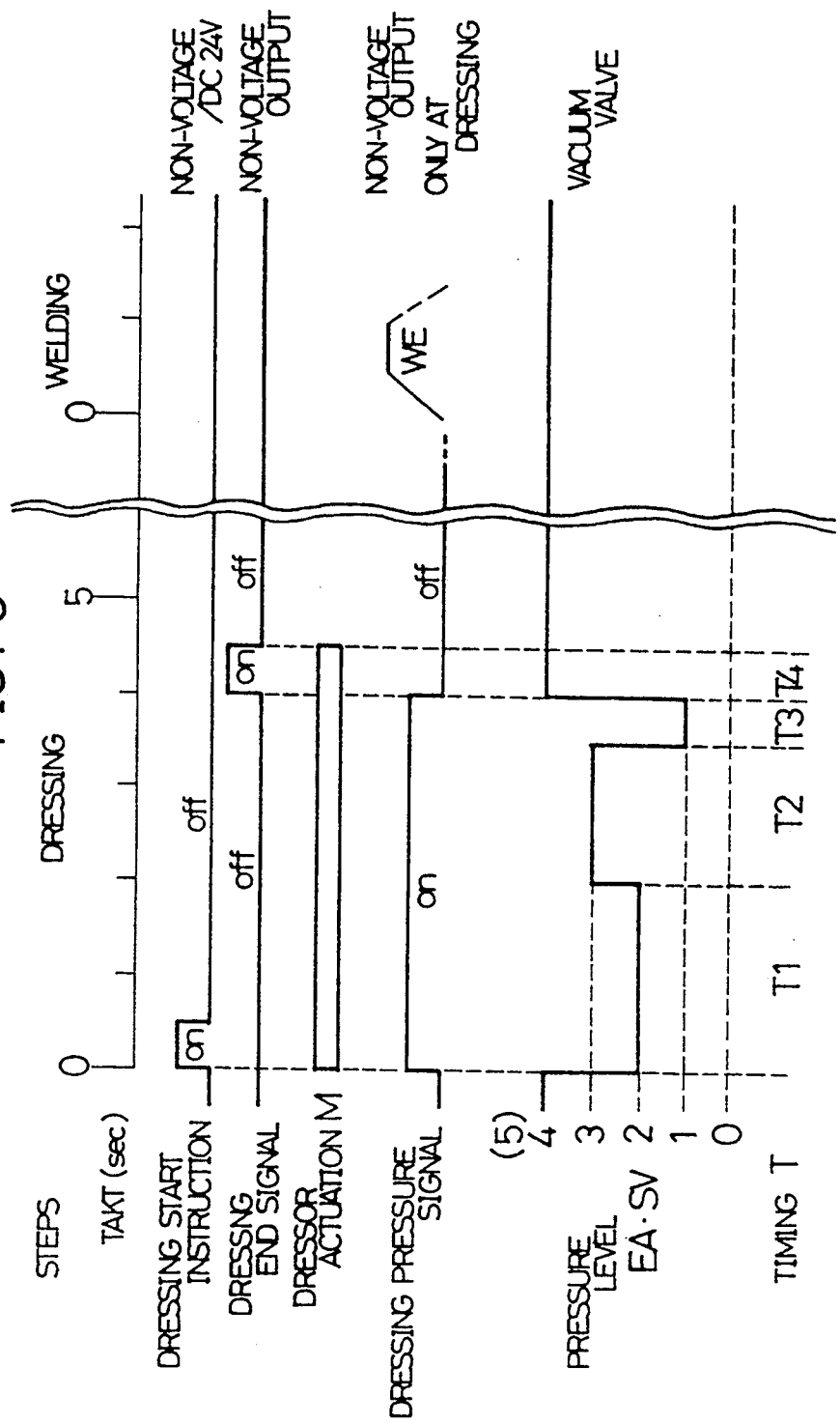
FIG. 5 is a timing chart illustrating change of pressure applied on an electrode tip.

In operation, FIG. 5 illustrates the change of pressure applied on blade holder 17 by the electrode tip 4. As shown, the maximum pressure at dressing is equal or less than that of welding. When an electrode tip 4 is set on blade holder 17, the electrode tip 4 is pressed with a force relatively smaller than that applied at welding for minimizing the shock. And when the end surface is machined, the electrode tip 4 is pressed with a force slightly greater than that applied at setting in order to reduce the machining time and, after a predetermined time period, again with a smaller force. Such an again reducing the pressure allows the electrode tip 4 to slightly vibrate in the horizontal direction, which serves to remove a protrusion produced on the end of the electrode tip 4 to accomplish an excellent finishing.

More specifically, for setting the electrode tip 4 in the period T1 of 2 to 6 seconds, the preliminary pressure of a level "2" in the order of 100 kg. force is applied; and, during the period of T2 of 1.5 to 6 seconds after the electrode tip 4 engages the slant blade 18, a main pressure of a level "3" in the order of 150 kg. force is applied to perform rough machining. Then, during the period of T3 of 1 to 6 seconds for final finishing, the smallest pressure of a level "1" in the order of 80 kg. force is applied. On the other hand, during the welding period T4, a higher pressure of 25 to 300 kg. force is applied on the electrode tip 4.

The following shows each operation during each timing:

T1: with preliminary pressure: to prevent excessive penetration or damage of bite, performing a soft working in the range of not affecting the takt time, also contributing to reduce the torque necessary for the drive motor.

T2: with main pressure: to prevent an elongated time, raising a pressure for rough machining of the slant surface and end surface.

T3: with finishing pressure: applying a lowered pressure to prevent production of burrs or stepping to improve surface roughness.

T4: with welding pressure: lowering the back air pressure to the pressure level suitable for welding, and rapidly separating the welding gun.

Pressure control in this manner allows to prevent damage of blades due to shock caused upon setting of the electrode tip 4 and production of burrs, and also to reform an electrode tip 4 automatically with a minimized time period and using a cheaper tip material. Since a reduced pressure is applied at the initial step of dressing, a drive motor 29 having a small torque may be employed. Even in such a case, the rotational speed can be increased during machining, and thus an electrode tip can be reformed in a short period of time. Further, instead of air cylinder 6, a hydraulic cylinder may be also employed, wherein a solenoid valve 7 is interposed in the fluid passage.

As described above, the blade holder 17 is provided with a clearance 20, and the end blade 19 is formed to slightly extend with its end portion over the center of blade holder 17, thereby preventing blinding caused by cutting chips, and a protrusion formed on the end of electrode tip 4, thus providing an excellent reforming of the electrode tip.

Figure 6:
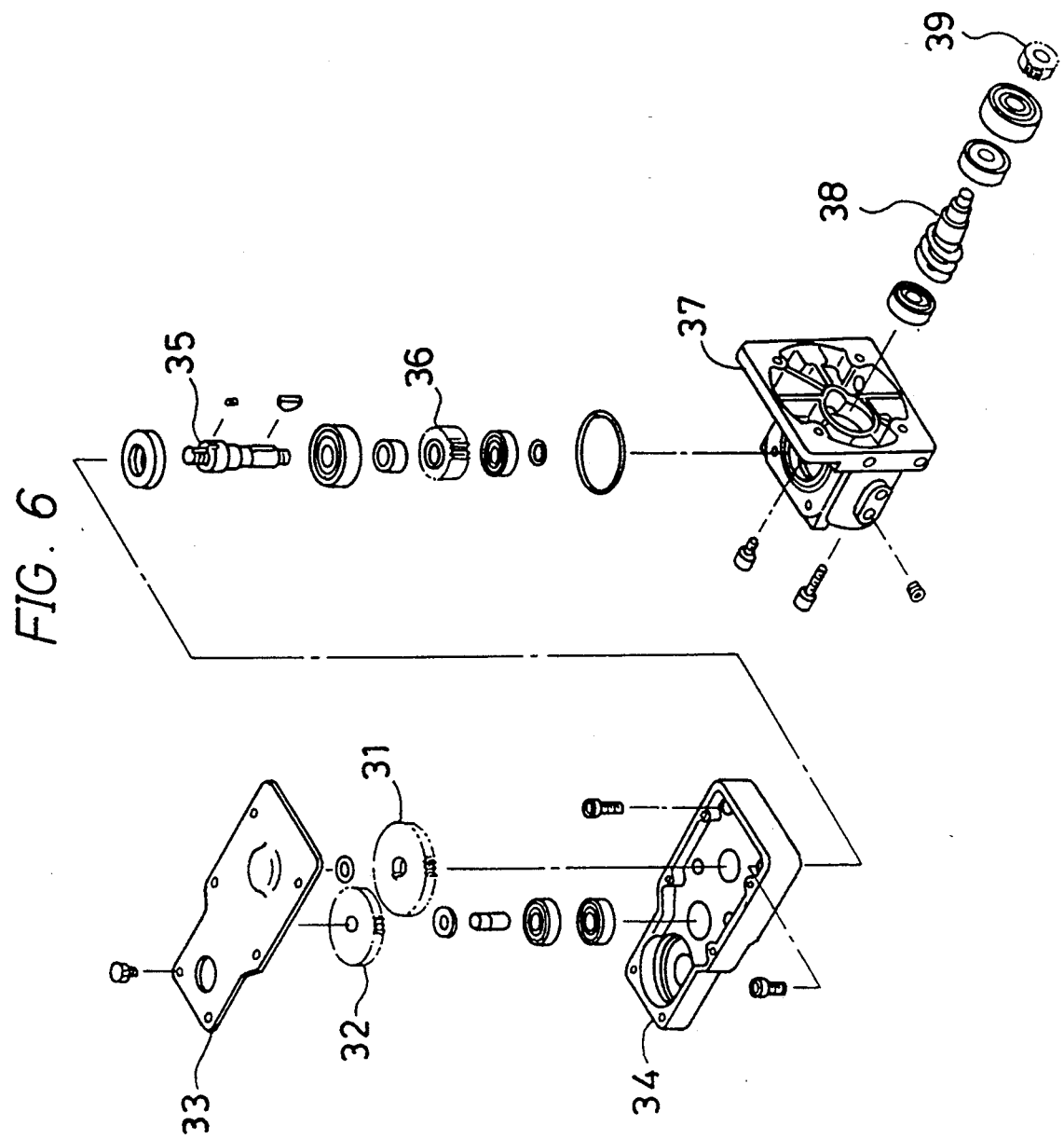
FIG. 6 is an exploded perspective view of a dressing device.
Figure 7:
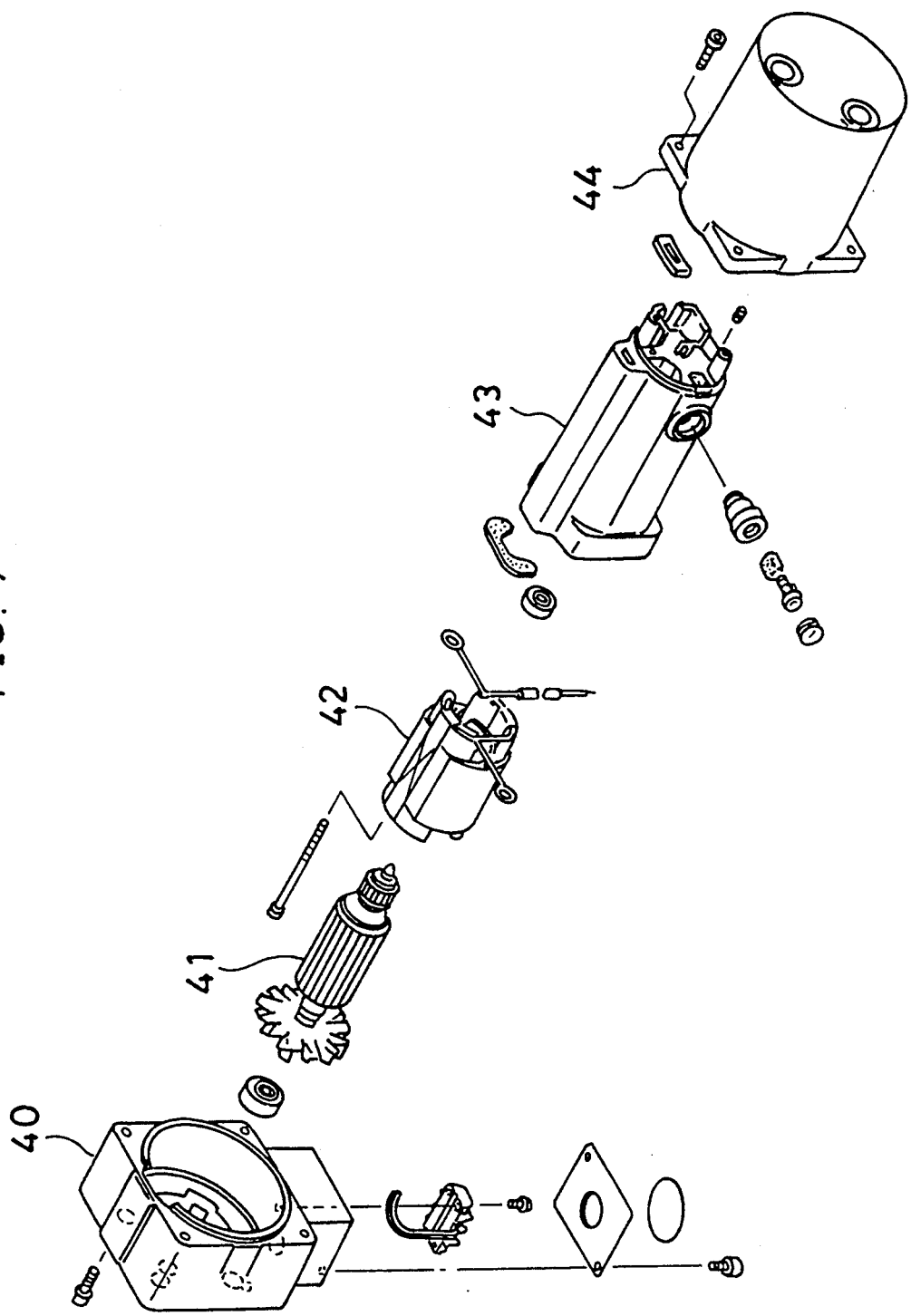
FIG. 7 is also an exploded perspective view of a dressing device.

As shown in FIG. 6 and FIG. 7, the blade holder 17 is formed integrally with a case 34 with a cover 33 for enclosing power transmitting gears 31 and 32, a central hole of gear 31 receives a rod 35 provided with a key, and the power is transmitted through a gear (screw gear) 36. The case 34 may be mounted to a base 37 in a desired direction, that is, the mounting angle thereof is flexibly selected. Enclosed in the base 37 is a worm 38 which engages the gear 36 and rotates the same.

Also in the base 27, a gear 39 which coaxially rotates the worm 38 is enclosed, and these are closed by a cover 40. Numerals 41 to 43 are a rotor, a stator and a cover of the drive motor 29, respectively, and all are covered by a cover case 44, and the power is transmitted to blade holder 17 via each of the gears.

Figure 8:
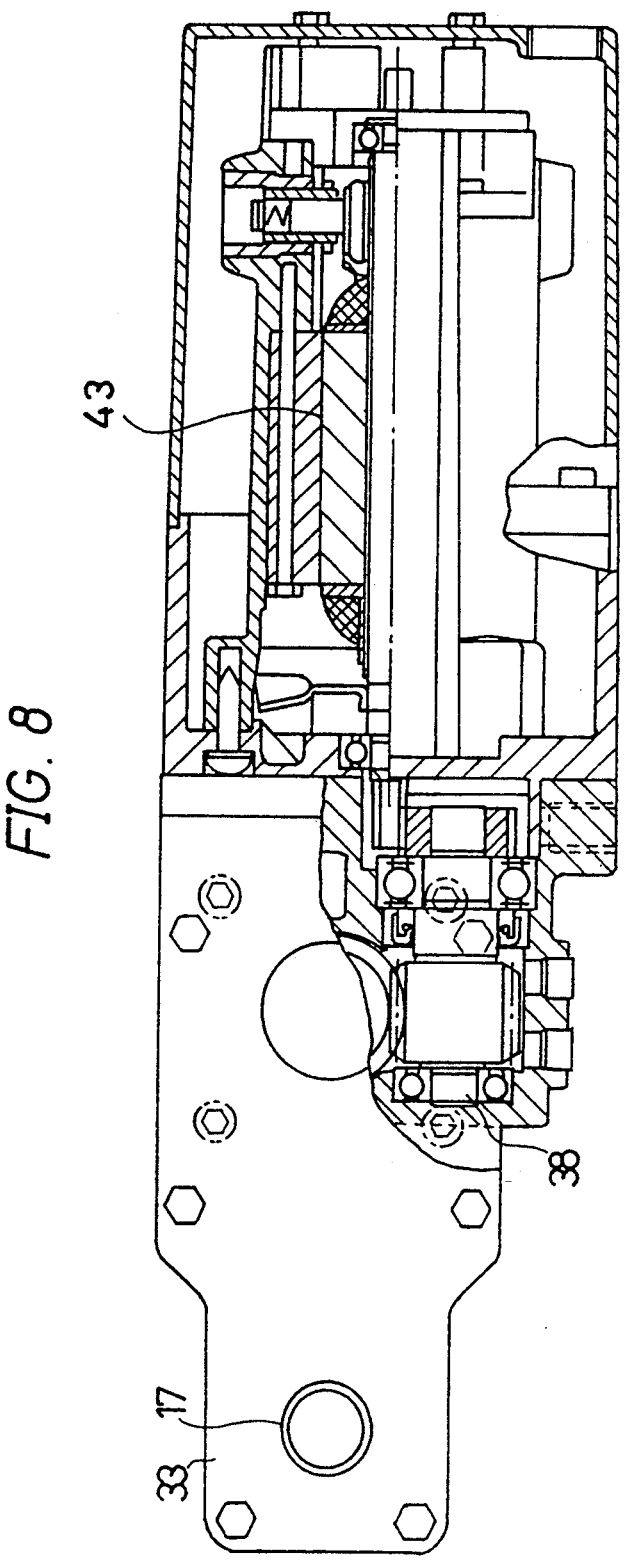
FIG. 8 is a partially sectioned plan view of the dressing device.
Figure 9:
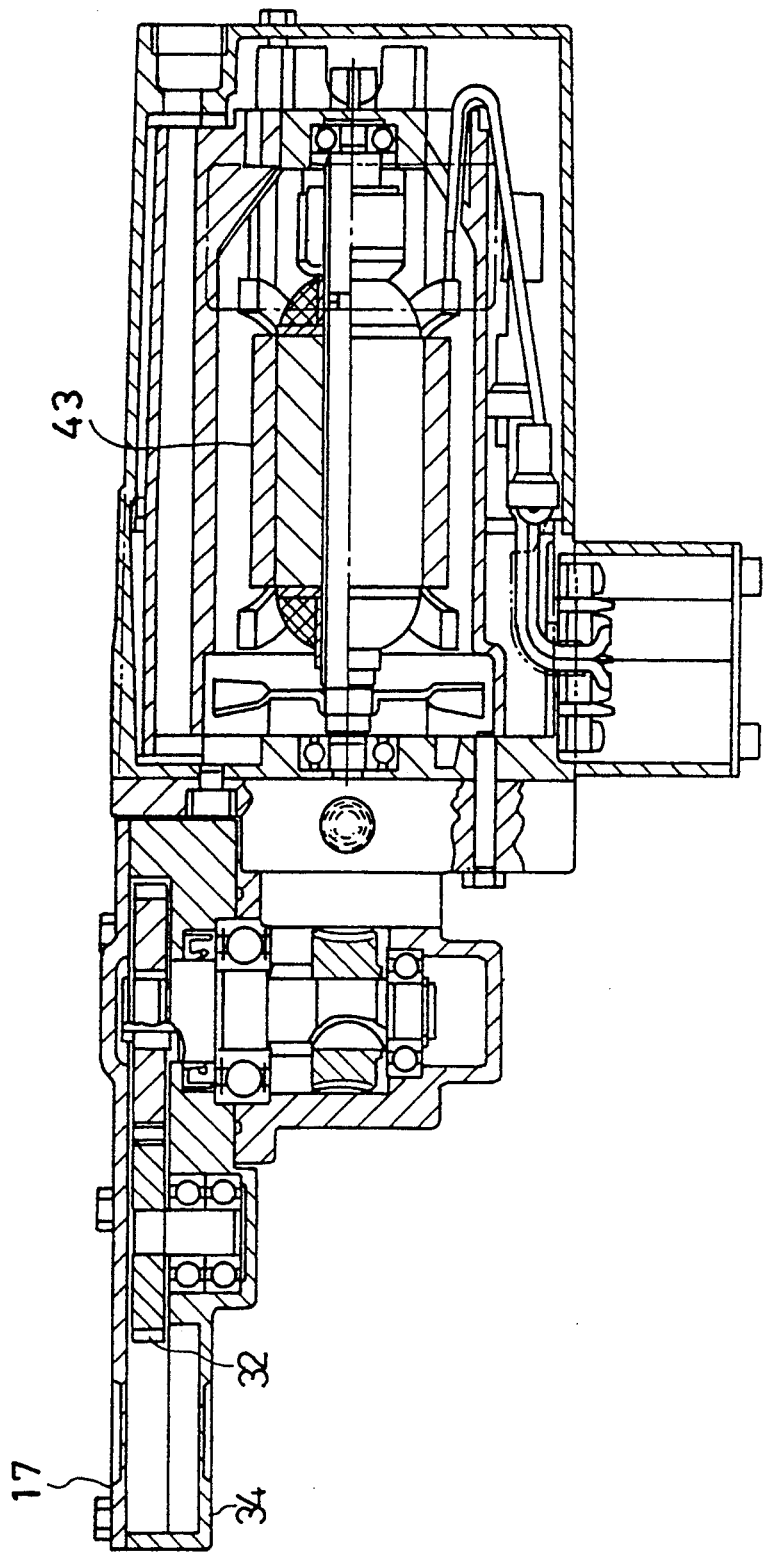
FIG. 9 is a side sectional view of the dressing device.

FIG. 8 and FIG. 9 are, respectively, a partially sectioned plan view of and a side sectional view of the dressing device 5, in which the same numerals are used for the same members as FIG. 6 and FIG. 7.

What is claimed is:

1. A dressing apparatus for reforming an electrode tip by a rotating cutting blade comprising:
   a blade holder;
   a first blade disposed on said blade holder;
   a second blade disposed on said blade holder;
   a pressure control means for controlling a pressure applied on said electrode tip against said blade holder; whereby said electrode tip being pressed at setting of said electrode tip with a first force relatively smaller than a force applied at welding,
   said electrode tip being pressed when being machined with a second force slightly greater than said first force, and after a predetermined time period with a further smaller force.

2. A dressing apparatus according to claim 1, wherein a clearance for discharging cutting chips is formed over the entire length of said blade holder, and said first blade is an end blade slightly extends with an end thereof over a center of said blade holder.

3. A dressing apparatus according to claim 2, wherein said second blade is a slant machining blade and said first blade is said end machining blade and are mounted in said blade holder.

4. A dressing apparatus according to claim 2, wherein said blade holder is mounted at a predetermined desired angular direction.

5. A dressing apparatus according to claim 4, wherein the maximum pressure applied on said electrode tip at dressing is the same or less than that applied at welding.

6. A dressing apparatus for reforming an electrode tip by a rotating cutting blade comprising:
   a blade holder equipped with a first and second blade:
   a pressure control means for controlling a pressure which is produced when an electrode tip is pressed against said blade holder equipped with said first blade that is a cutting blade, whereby the pressure applied on said electrode tip is controlled by means of a control valve interposed in a fluid passage in communication with an air cylinder or a hydraulic cylinder which applies pressure on said electrode tip.

7. A dressing apparatus according to claim 6, wherein a pressing time for said electrode tip and the pressure applied thereon are controlled by said control valve interposed in said fluid passage.

8. A dressing apparatus for reforming an electrode tip by a rotating cutting blade comprising:
   a blade holder; and
   a pressure control means for controlling a pressure applied on said electrode tip against said blade holder, for pressing said electrode tip at a setting of said electrode tip with a first force relatively smaller than a force applied at welding, and for pressing said electrode tip when being machined with a second force slightly greater than said first force, and after a predetermined time period with a further smaller force.

9. A dressing apparatus for reforming an electrode tip by a rotating cutting blade comprising:

a control valve interposed in a fluid passage in communication with an air cylinder or a hydraulic cylinder which applies pressure on an electrode tip; and a pressure control means for controlling the pressure which is produced when said electrode tip is pressed against a blade holder equipped with a cutting blade, and for controlling the pressure applied on said electrode tip by means of said control valve.

* * * * *